March 2, 1965   H. F. ANDERSON ETAL   3,171,659
SEALS FOR VALVE STEMS FOR INTERNAL COMBUSTION
ENGINES AND THE LIKE
Filed Dec. 21, 1962
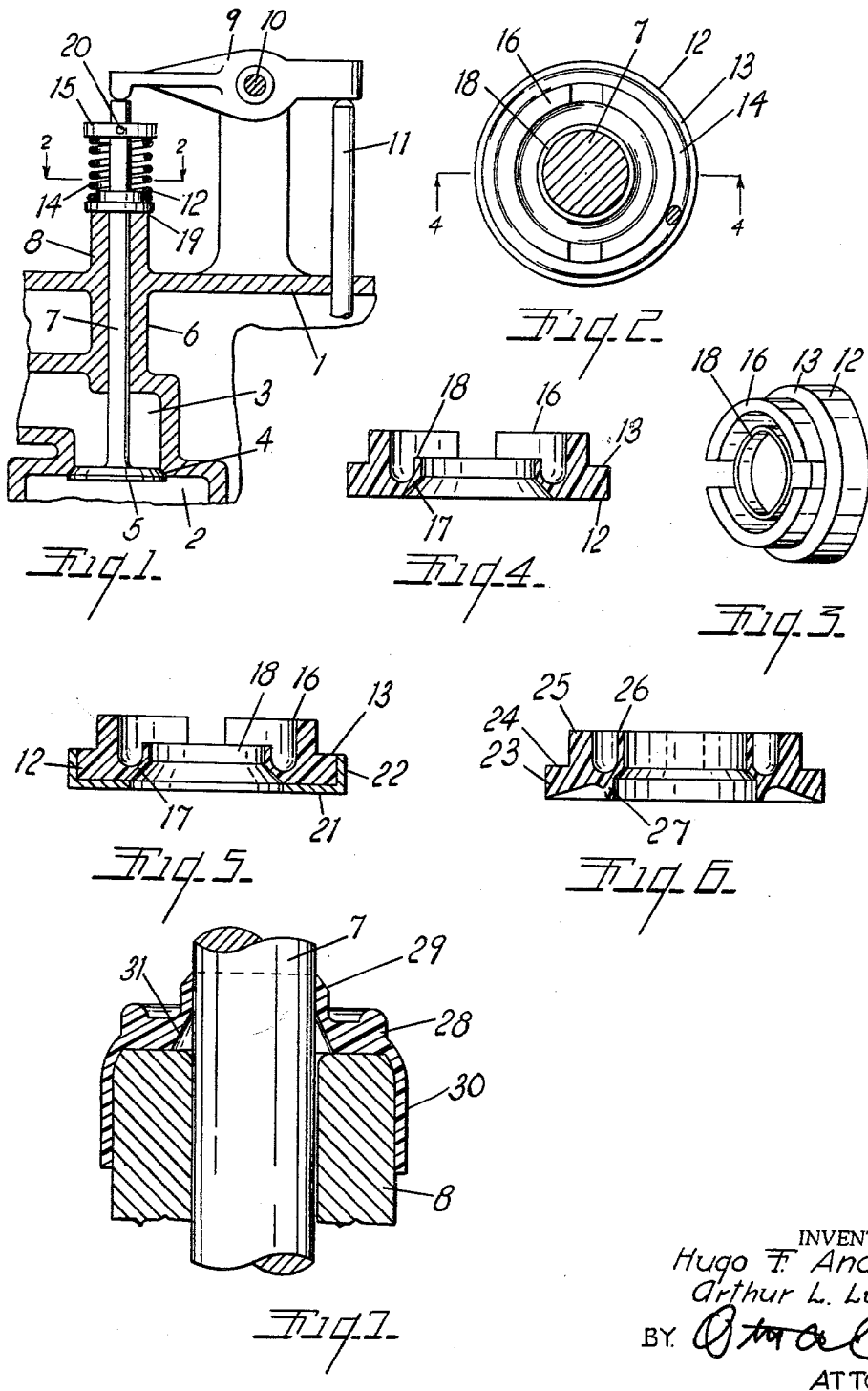
INVENTORS
Hugo F. Anderson
Arthur L. Ludwig
BY
ATTORNEY.

United States Patent Office 3,171,659
Patented Mar. 2, 1965

3,171,659
SEALS FOR VALVE STEMS FOR INTERNAL COMBUSTION ENGINES AND THE LIKE
Hugo F. Anderson and Arthur L. Ludwig, Hastings, Mich., assignors to Hastings Manufacturing Company, Hastings, Mich., a corporation of Michigan
Filed Dec. 21, 1962, Ser. No. 246,454
2 Claims. (Cl. 277—33)

This invention relates to improvements in seal assemblies for internal combustion engines and the like and seal units therefor. The principle objects of this invention are:

First, to provide a valve assembly for internal combustion engines in which the valve stem is effectively sealed.

Second, to provide a seal assembly readily adapted for use in valves of internal combustion engines of a widely used type.

Third, to provide a valve seal unit which is economically produced and effective for use in connection with valve stems of internal combustion engines that may be substantially worn.

Objects relating to details and economies of the invention will appear from the description to follow. The invention is defined and pointed out in the claims.

A preferred embodiment of the invention is illustrated in the accompanying drawing, in which:

FIG. 1 is a fragmentary view mainly in vertical section of an embodiment of our invention in an internal combustion engine, parts of which are conventionally shown.

FIG. 2 is an enlarged horizontal section on a line corresponding to line 2—2 of FIG. 1.

FIG. 3 is a perspective view of the seal unit of the embodiment of our invention shown in FIGS. 1 and 2.

FIG. 4 is a cross sectional view of the seal unit of FIGS. 1, 2 and 3 on a line corresponding to line 4—4 of FIG. 2.

FIG. 5 is a sectional view corresponding to that of FIG. 4 of a modified form or embodiment of our invention.

FIG. 6 is a cross sectional view of another form or embodiment of our invention.

FIG. 7 is a fragmentary view partially view partially in vertical section of another form or embodiment of our invention.

In the accompanying drawings we illustrate an embodiment of our invention in an internal combustion engine, the body 1 of the engine being illustrated conventionally, 2 being one of the cylinders provided with a passage 3 at the inner end of which is a valve seat 4 for the valve 5. The body member is provided with a guide 6 for the valve stem 7, this guide having a tubular portion 8 constituting a bearing extension for the valve stem and a support for coacting parts. The valve actuating member 9 is pivotally mounted at 10 and is actuated by the rod 11.

The seal unit of our invention illustrated in FIGS. 1-4 inclusive is formed desirably of thermoplastic material and comprises a form-retaining body portion 12 provided with an annular seat 13 for the valve seating spring 14, the outer end of which is in engagement with the collar 15 on the steam. The seal unit 12 has outwardly projecting segmental spring supports or holders 16, the inner coil of the spring embracing these holders as is illustrated in FIG. 1. These holders 16 are desirably segmental as they yield somewhat to receive the end coils of springs which may vary in diameter but they are in lateral supporting engagement with the end coil as is illustrated.

The seal unit has an integral outwardly inclined springably resilient stem seal member 17 terminating in an outwardly projecting annular flange-like portion 18 which sealingly embraces the valve. This unit 12 is clampingly and sealingly urged on the end face 19 of the valve stem guide 8.

In assembling, the seal unit is telescoped over the stem, the spring 14 positioned thereon and clamped under tension by means of the collar 15 which is retained by means of a screw conventionally illustrated at 20.

The valve stem is in reciprocating or sliding engagement with the flange-like portion 18 of the seal 17 which is, as stated, springably resilient and desirably projects outwardly and inwardly as is illustrated in the embodiment shown in FIGS. 1-5 inclusive.

In the embodiment shown in FIG. 5, the seal unit is provided with a reinforcing member 21 disposed on the inner side thereof and having an outwardly projecting peripheral flange 22 in supporting engagement with the periphery of the seal unit which is of the type illustrated in FIGS. 1-4 inclusive.

In the embodiment shown in FIG. 6, the seal unit 23 is provided with a seat 24 for the spring 14 and an upwardly projecting flange 25 at the inner end of the seat. The stem-engaging collar portion 26 is of greater width than in the embodiment shown in FIGS. 1-5 inclusive and is provided with a flexible annular stem guide-engaging portion 27 which engages the end of the stem guide member and constitutes an effective seal.

The embodiments shown in FIGS. 1-6 inclusive are all provided with seats for the spring 14 so that they are urged against the outer end of the valve stem guide.

In the embodiment shown in FIG. 7, the seal unit 28 is provided with an upwardly projecting sealing flange 29 substantially as shown in the other embodiments but the body is provided with a downwardly projecting sleeve 30 which retainingly embraces the valve stem guide 8. This embodiment of our invention is designed to be used where the valve springs are arranged in other relations than that shown in FIG. 1.

It will be noted that in FIG. 7 the flange-like portion of the seal unit is supported by a flexibly yielding portion 31 corresponding to the springably yielding inwardly and outwardly projecting portion 17 of the embodiment shown in FIGS. 1-5 inclusive.

We have illustrated and described our invention in highly practical embodiments thereof. It will be understood that we have not attempted to illustrate the parts in their commercial proportions and that commercial proportions do vary in adaptation to the various types of internal combustion engines. It is believed that the disclosure will enable those skilled in the art to embody or adapt our invention to different makes and types of engines as may be desired.

Having thus described the invention, what is claimed as new and desired to secure by Letters Patent is:

1. A seal member for a reciprocating member including a form retaining body portion provided with an annular outwardly facing spring seat and having outwardly projecting segmental spring holder flanges disposed at the inner side of its said spring seat, said seal member having an integral outwardly inclined springably resilient seal unit terminating in a cylindrical sleeve-like portion of substantial width adapted to slidably receive a reciprocating member.

2. A seal member for a valve stem which is reciprocatingly disposed in a valve stem guide having a seal member seat at its outer end, said seal member being of thermoplastic material and including an annular body portion adapted to be seated on the seal member seat and having an annular outwardly facing seat for the inner end of a coil spring, the outer end of which is operatively associated with the valve stem, said body portion also having an outwardly projecting segmental portion disposed at the inner side of said spring seat for laterally supporting the inner end of a coil spring disposed on said seat, said seal member also having integral therewith an inwardly inclined outwardly projecting conical springably resilient seal element terminating at its outer end in a sleeve-like outwardly projecting portion adapted to slidably embrace a valve stem reciprocatingly disposed in said valve stem guide.

References Cited by the Examiner

UNITED STATES PATENTS

| | | | |
|---|---|---|---|
| 897,023 | 8/08 | Schaap | 123—188 |
| 933,698 | 9/09 | Crook | 123—188 |
| 1,066,066 | 7/13 | Vidy | 277—212 XR |
| 1,683,293 | 9/28 | Lindbloom | 123—188 |
| 2,476,324 | 7/49 | Reich | 277—152 |
| 2,859,993 | 11/58 | Estey | 123—188 |
| 2,906,255 | 9/59 | Bunce | 123—188 |

FOREIGN PATENTS 866,665   4/61   Great Britain.

LEWIS J. LENNY, *Primary Examiner.*

RICHARD WILKINSON, SAMUEL ROTHBERG, EDWARD V. BENHAM, *Examiners.*